S. S. CURTISS.
INCLINOMETER.
APPLICATION FILED AUG. 27, 1910.

1,009,832.

Patented Nov. 28, 1911.

2 SHEETS—SHEET 1.

WITNESSES:

INVENTOR
Summerfield S. Curtiss
BY
ATTORNEY

S. S. CURTISS.
INCLINOMETER.
APPLICATION FILED AUG. 27, 1910.

1,009,832.

Patented Nov. 28, 1911.

UNITED STATES PATENT OFFICE.

SUMMERFIELD S. CURTISS, OF NEW YORK, N. Y.

INCLINOMETER.

1,009,832.

Specification of Letters Patent.  Patented Nov. 28, 1911.

Application filed August 27, 1910.  Serial No. 579,320.

*To all whom it may concern.*

Be it known that I, SUMMERFIELD S. CURTISS, a citizen of the United States, residing at New York, in the county of New York and State of New York, have invented certain new and useful Improvements in Inclinometers, of which the following is a specification, reference being had therein to the accompanying drawing.

This invention relates to inclinometers, and the principal object of the same is to provide an instrument of the character stated that will readily and accurately indicate the angular positions of a vessel and with which is combined a compass so that the direction of travel can also be readily ascertained.

In carrying out the objects of the invention generally stated above, it will be understood, of course, that the essential features thereof are necessarily susceptible of changes in details and structural arrangement, one preferred and practical embodiment of which is shown in the accompanying drawings, wherein:—

Figure 1:
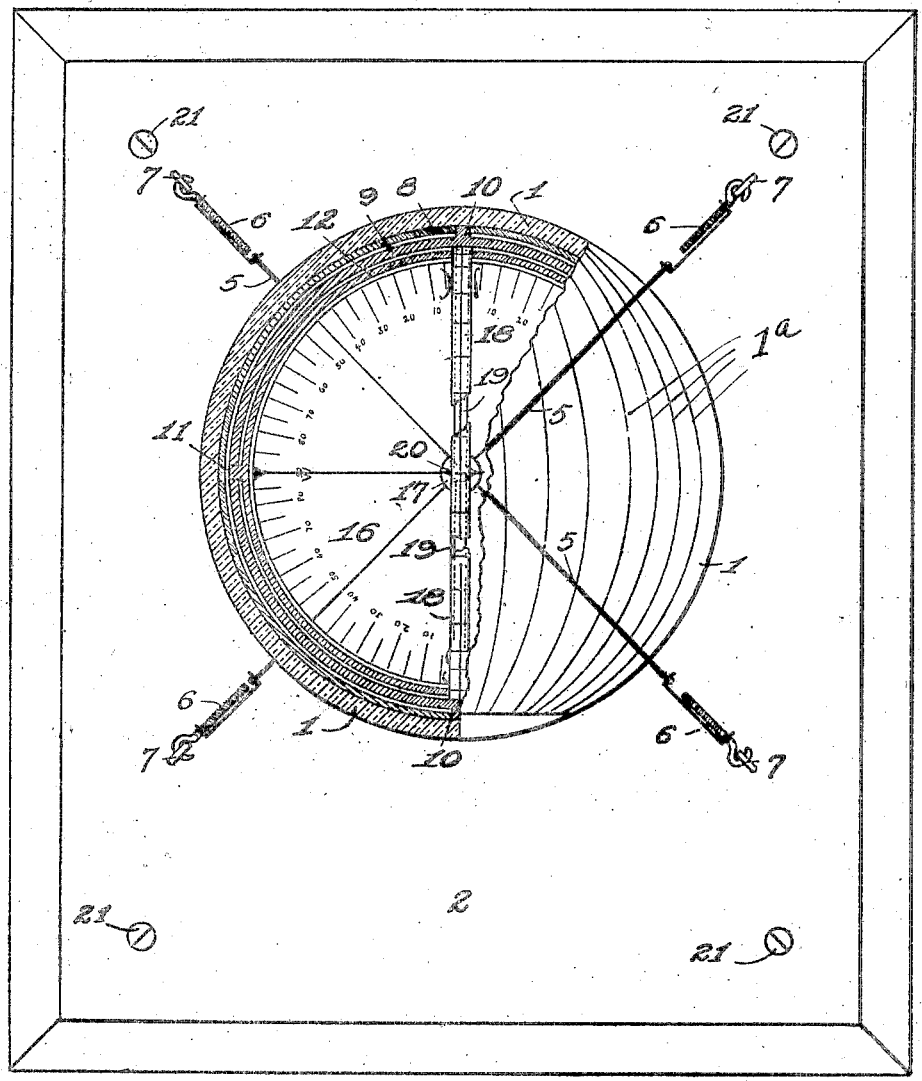
Figure 2:
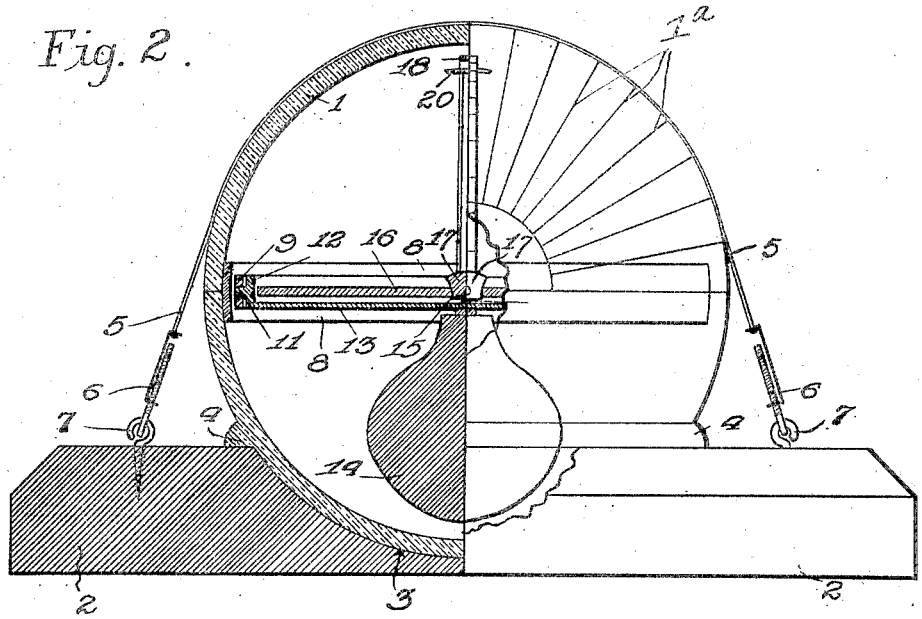
Figure 3:
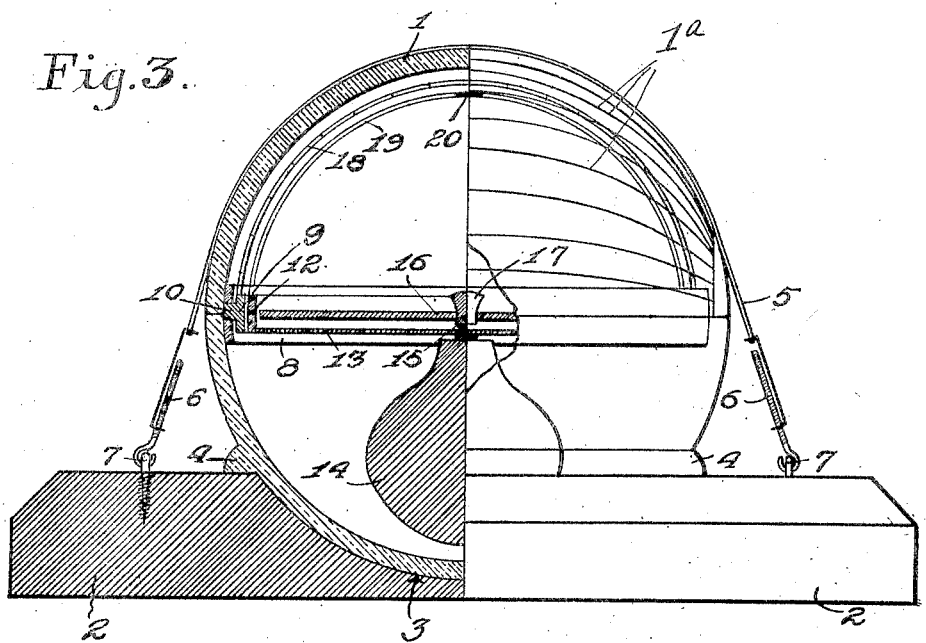

Figure 1 is a top plan view, partly in section of the improved inclinometer. Fig. 2 is a part elevation and part vertical sectional view thereof. Fig. 3 is a view similar to Fig. 2 but taken at right angles thereto.

The improved inclinometer includes in its general organization a transparent casing 1 that has been shown in spherical form and composed of upper and lower sections.

The instrument can be used overhead or, as shown, mounted in a base 2 which is provided with a recess 3 in which the lower section of the casing is seated, and said lower section is preferably equipped with a rest flange 4 that engages the base to prevent the casing wabbling. As an additional safeguard, cables 5 and turnbuckles 6 are used for rigidly but detachably fastening the casing to the eyes 7 of the base 2.

Internally, the casing is provided with an annular supporting band 8 that overlaps the meeting edges of the two sections of the casing. A ring 9 is provided with oppositely disposed laterally projecting pivot lugs 10 which engage the band 8 to pivotally support said ring within said band, and said ring, in turn, and by similar lugs 11, pivotally supports an inner ring 12. Said inner ring 12 is provided with a supporting strip 13 from the center of the bottom of which a weight 14 depends. The upper surface of said strip is provided with a centrally located vertically arranged pin 15 upon which a compass card 16 is loosely mounted. A nut 17 is employed for retaining the card 16 on said pin.

Ring 9 carries an arched band 18 that is provided with degree scales which correspond with longitudinally extending degree lines 1ª which are formed on the casing 1. Ring 12 carries an arched band 19 that is inclosed by the arched band 18 and provided with a pointer 20 that coöperates with the degree scales of band 18 to indicate the angle of the base 2.

The base 2, as shown in Fig. 1, is provided with detachable fasteners 21 by means of which the same may be readily attached to or detached from a suitable support on the vessel.

This invention is primarily intended for use in connection with vessels that travel in more than one plane, such for instance, as airships, submarines, and the like. It will be readily understood that by means of the casing 1 that is stationary relative to the vessel it is attached to, and the universally supported rings within said casing and provided with arches 18 and 19, one being provided with a pointer and the other with degree marks, the angles of direction in a horizontal plane and the angles of inclination and declination from the equilibrium of the longitudinal and transverse axis of the vessel are simultaneously indicated.

In practice it has been found that the type of base 2, shown in the accompanying drawing, provides simple means whereby the instrument may be attached to a support; but it will be understood, of course, that the same is but one of the many ways in which the casing may be attached to said support.

What I claim as my invention is:

1. An instrument, of the character described comprising a spherical transparent casing formed of two separable sections provided with longitudinal degree lines, means inclosed by said casing and coöperating with said degree lines for indicating the inclination of said casing together with the support thereof relatively to a horizontal plane, and a weight carried by said means.

2. An instrument of the character described comprising a spherical casing provided with degree lines on the upper portion thereof, arched means universally mounted in said casing and coöperating with said lines for indicating the inclination relatively to a horizontal plane, and a weight for normally retaining said arched means in a vertical position.

3. An instrument of the character described comprising a casing, a stationary band horizontally arranged therein, an outer ring pivotally connected to said band, an inner ring pivotally connected to the outer ring and inclosed thereby, an arch carried by the inner ring and provided with a pointer, an arch carried by the outer ring and provided with degree scales, and a pendent centrally located weight carried by the inner ring.

4. An instrument of the character described comprising a casing, provided with degree indications, an annular support horizontally arranged therein, an outer ring pivotally connected to said support, an arch carried by said ring and provided with degree indications, an inner ring pivotally connected to the outer ring and provided with a pointer, and a pendent weight carried by said inner ring.

5. An instrument of the character described comprising a casing, universally mounted inner and outer rings in said casing, coöperative degree indicating means carried by said rings and arranged in crossing relation, a compass card carried by the inner ring, and a weight carried by one of said rings.

6. An instrument of the character described comprising a flat base provided with a central recess, a sectional casing seated therein and provided with a flange for engaging said base, means for attaching said base to a support, and means inclosed by said casing for indicating the inclination of the same relatively to a horizontal plane.

7. An instrument of the character described comprising a transparent casing, an annular support therein, an outer ring pivotally connected to said support, an inner ring pivotally connected to said outer ring, a supporting strip carried by the inner ring, a weight depending from the center of the bottom of said strip, a pin projecting from the center of the upper surface of said strip, a compass card carried by said pin, and coöperating means carried by said rings for indicating inclination relatively to a horizontal plane.

8. An instrument of the character described comprising a transparent casing provided with degree lines, a horizontally arranged ring pivotally mounted within said casing, an arched band carried by said ring and provided with degree lines, a second horizontally arranged ring within the first mentioned ring and pivotally connected thereto, an arched band carried by the second mentioned ring and inclosed by the first mentioned band, indicators carried by the second mentioned band, and a weight suspended from said second mentioned ring.

9. An instrument of the character described comprising a casing, an inner and an outer ring universally mounted therein, degree indicating means, carried by said rings, a supporting strip carried by the inner ring, a weight suspended from said strip, a pin projecting from the upper surface of said strip, and a compass card loosely mounted on said pin.

In testimony whereof I hereunto affix my signature in presence of two witnesses.

SUMMERFIELD S. CURTISS.

Witnesses:
 GEORGE H. BANSE,
 ARTHUR BERGER.